Nov. 4, 1958  S. R. STILES  2,859,259
ALKYLATION OF HYDROCARBONS
Filed May 31, 1955
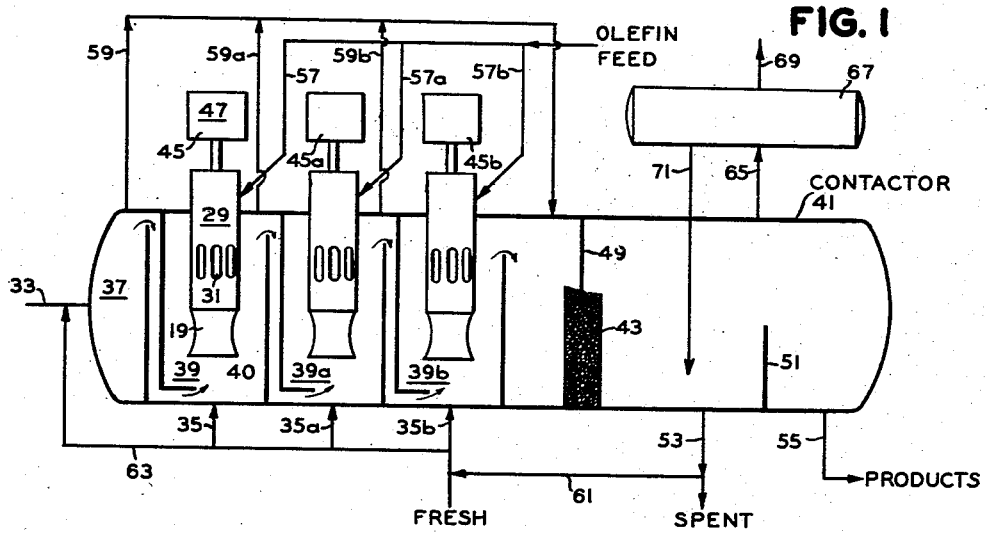
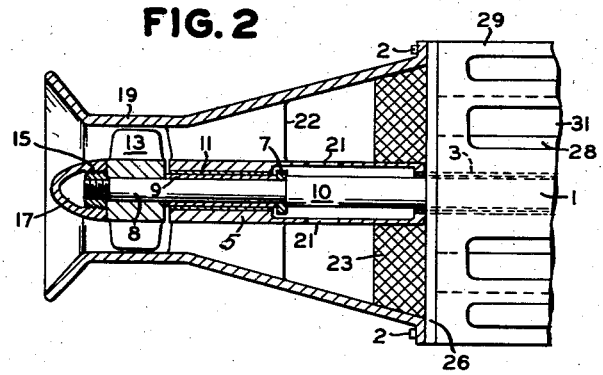
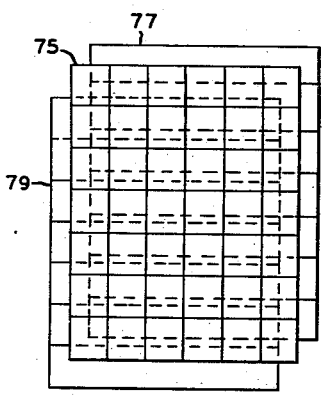
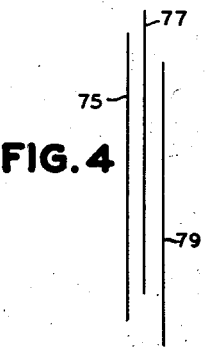
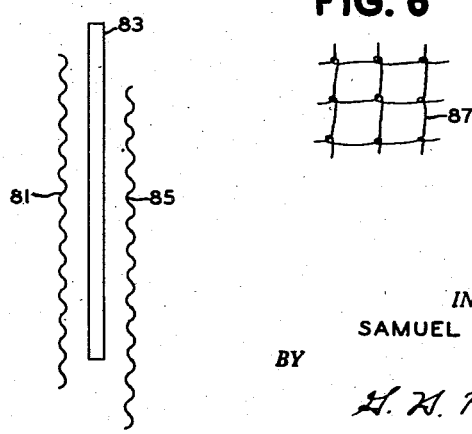
INVENTOR.
SAMUEL R. STILES
BY
*H. H. Palmer*
ATTORNEYS

# United States Patent Office 2,859,259
Patented Nov. 4, 1958

2,859,259

ALKYLATION OF HYDROCARBONS

Samuel R. Stiles, Cresskill, N. J., assignor to The M. W. Kellogg Company, Jersey City, N. J., a corporation of Delaware Application May 31, 1955, Serial No. 511,987

7 Claims. (Cl. 260—683.58)

This invention relates to method and means for contacting hydrocarbon liquids, more particularly, it relates to method and means for intimately mixing liquids in an alkylation process. In still another aspect, it relates to method and means for dispersing olefins in a high velocity catalyst-isoparaffin emulsion.

One of the major problems in the alkylation of hydrocarbons with olefins in the presence of a liquid catalyst is the prevention of the formation of side products which decrease the yield of alkylate and dilute and contaminate the alkylation catalyst. For example, in the alkylation of isoparaffins with olefins in the presence of sulfuric acid undesirable polymers and acid esters are formed. In practice, the quantity of side products is minimized by controlling the ratio of olefin to alkylatable hydrocarbon and by contacting the reactants under conditions of violent turbulence, thereby promoting the alkylation reactions.

It is an object of this invention to provide improved method and means for contacting alkylation reactants.

Another object of this invention is to provide new and useful method and means for finely subdividing and dispersing olefins in a moving stream of catalyst-hydrocarbon emulsion.

Still another object of this invention is to provide improved method and means for finely subdividing and dispersing olefins in a moving acid-hydrocarbon emulsion at a point of high emulsion velocity.

These and other objects of this invention will become more apparent from the following detailed discussion and description.

In its broad aspect this invention comprises method and means of intimately mixing alkylation reactants. In a more specific aspect it comprises method and means for finely subdividing and uniformly dispersing olefin hydrocarbons in an agitated swiftly moving mass of emulsified catalyst and isoparaffin hydrocarbons by passage of the mixture through an impingement mat.

This invention is applicable to alkylation processes generally, including the alkylation of paraffins, isoparaffins, aromatic compounds, cycloaliphatic compounds, alcohols, etc., with olefinic hydrocarbons. The alkylation reaction takes place over a wide range of temperature ranging from as low as $-50°$ F. when alkylating isoparaffins to as high as about 600° F. when certain aromatic compounds are reacted with olefins. It may be conveniently carried out under pressures at or below atmospheric or as high as several hundred atmospheres. To establish conditions favorable for the production of high octane alkylate in large yields, it is desirable to contact the reactants under conditions of violent agitation, yet provide uniform mixing, and to maintain at the contact point a high concentration of alkylatable hydrocarbon to olefin. This is accomplished herein by introducing olefinic hydrocarbons into a turbulent moving stream of alkylatable hydrocarbons and acid at the point where the velocity of this stream is high and then passing the mixture through an impingement mat. The reactant ratio at this point is usually very high and may vary between about 2 and about 2000 mols of alkylatable hydrocarbon per mol of olefin.

A wide variety of catalysts are available for use in the alkylation of an alkylatable compound with an olefin or more specifically an isoparaffin with an olefin. Those frequently employed include acids, such as sulfuric, hydrofluoric, phosphoric, chlorosulfonic, fluorosulfonic, etc., which may be used either singly or in mixtures. Non-solid Friedel-Crafts catalysts which form a liquid phase substantially immiscible with the hydrocarbon phase may be used. They include the conventional Friedel-Crafts metallic halides in acid, such as those just enumerated and metallic halide-hydrocarbon complexes. Other liquid catalysts which provide a heterogeneous reaction mixture with hydrocarbons may also be used within the scope of this invention.

In general, this invention accomplishes two valuable results:

(1) By providing better mixing and contact between the reactants it improves olefin dispersion in the acid and allows the same conversion with fewer reaction stages or a higher purity product with control over inferior side reactions with the same number of reaction stages, and (2) By providing for contact of the reactants in such a manner as to give a minimum uniform concentration of olefin at the contact point, polymerization reactions are decreased with a resulting increase in alkylate yield.

The latter aspect of this invention makes it particularly applicable in the alkylation of hydrocarbons with olefins in the presence of sulfuric acid. As mentioned previously, one of the basic problems in alkylation is contamination of the catalyst with undesirable reaction products, in this instance primarily polymers and/or esters. In order to effectively carry out the alkylation reactions, it is necessary to maintain acid strength at a high level of concentration, namely above 85 percent and preferably above about 92 percent. By the method of this invention polymerization of olefins is reduced and sulfuric acid catalyst contamination is decreased with a proportionate decrease in acid consumption and cost of acid recovery. In addition, alkylate yield is increased due to the higher concentration of free olefins in the reaction mixture.

The major alkylation process in use today involves the reaction of isoparaffins with olefins, in the presence of sulfuric acid to form valuable gasoline components. The isoparaffins used may be isobutane, isopentane, isohexane, etc., or mixtures thereof. Olefins more often reacted are proypylenes, butylenes, pentylenes, their isomers and mixtures thereof. It is within the scope of this invention to utilize any proportions of the above as feed stocks and, in addition, mixtures of isoparaffins and olefins with or without the presence of normal paraffins.

The alkylation of isoparaffins with olefins in the presence of sulfuric acid is preferably conducted in several stages and at a temperature between about 0° F. and about 150° F. The pressure in the reaction zone is maintained at a level sufficient to keep the reactants in a liquid state, usually between about atmospheric and about 100 p. s. i. g. The ratio of isoparaffin to olefin feed in each reaction stage, if several are used, is preferably maintained between about 2.0 and about 2000 mols per mol and the acid concentration therein is usually maintained between about 0.25 and about 15 volumes of acid per volume of olefin.

The alkylation of an aromatic or a cycloaliphatic compound with an olefinic compound results in the production of compounds which may be useful in themselves, but which generally are more useful as intermediates in the manufacture of other chemical compounds. Examples of aromatic and cycloaliphatic alkylation reactions include the reaction of benzenes, naphthalenes, phenols, etc., and their homologues with olefins in the presence of mixed catalysts, for example, hydrofluoric acid-boron trifluoride or liquid complexes of aluminum chloride with acids and/or hydrocarbons. In general, these reactions are carried out between about 30 and about 120° F. under atmospheric or superatmospheric pressures, as required to maintain the reactants in a liquid state. Other typical reactions are benzene with propylene in the presence of liquid phosphoric acid, benzenes with isoparaffins in the presence of olefins and an acid, such as sulfuric or hydrofluoric isoparaffins with alkyl substituted cyclopentanes in the presence of an acid such as sulfuric or hydrofluoric, etc. The reaction conditions used in these and similar reactions involve temperatures and pressures comparable to those illustrated. Normally the alkylatable compound is present in greater quantity than the olefinic reactant, and the relative concentrations of catalyst and hydrocarbon reactants in general conform to those required for the alkylation of isoparaffins. The pressures may vary from subatmospheric to several atmospheres depending on the particular reactants, and the reaction time required varies from as low as a few minutes to several hours.

The olefinic reactants used in alkylating acyclic, cycloaliphatic and aromatic compounds are usually the low boiling olefins previously mentioned; however, other more complex olefinic compounds well known to those in the art which are capable of entering into the alkylation reactions are also included within the scope of this invention.

In a typical application of this invention, isobutane and sulfuric acid are introduced into an alkylation reaction zone, and are violently agitated to form an emulsion, this being the preferred method of assuring intimate contact between the acid catalyst and the hydrocarbon to be alkylated. Inasmuch as the reaction occurs at the liquid-liquid interface, it is necessary to provide violent agitation if the desired reaction is to take place. The major portion of the isobutane feed is provided by a recycle stream obtained from subsequent distillation steps; any additional quantity of isobutane required, for example, that amount needed to start up the unit, is usually supplied from an independent source. The agitation may be provided in a number of ways, however, usually a conventional mixer or pump provides a means for creating and moving the emulsion at high velocity and also for circulating the emulsion in the contact zone. The alkylation reaction may be carried out in one step, although more usually, several steps in series are provided with a portion of the olefin reactant being admitted to each stage and contacting isobutane passing serially through the successive stages. The alkylation feed which contains the olefin reactant also contains isobutane, butylene, propane, propylene, and frequently small quantities of lighter paraffins. The temperature in the reaction zone is maintained at a constant low level by vaporizing therefrom the lighter components in the reaction products, more usually a mixture of butane, isobutane, propane, and any lower boiling compounds. Because of the high concentration of isobutane in the reactor liquid these vapors are predominantly isobutane. The vapors are compressed and condensed, and the condensate after the removal of propane and the lighter components is returned to the alkylation reaction zone in the isobutane recycle. The material leaving the last reaction stage comprising a mixture of alkylate, acid and unreacted hydrocarbons passes into a settling zone wherein contaminated acid catalyst, containing polymers and other impurities is separated from the alkylate and unreacted isobutane. A portion of the contaminated acid is recycled to the contacting zone and the remainder is either purified for reuse, used in another process where a high degree of purity is not required, or is discarded. Alkylate and unreacted isobutane are further processed to separate the alkylate, and the isobutane is recycled to the contacting zone.

In the method of this invention, olefins are introduced into a turbulent high velocity emulsion produced in the mixer and are finely subdivided and evenly dispersed therein by passing the resulting mixture through a wire impingement mat. More usually the olefins are introduced into the emulsion at a point downstream of the emulsion forming section and preferably at a point of maximum emulsion velocity.

In their preferred construction the impingement mats used in carrying out the invention are formed of wires or ribbons so arranged as to present a large surface for impingement of flowing droplets of olefin. The wires used may vary in size ranging from about 0.001 inch in diameter to as large as about 0.1 inch in diameter. When ribbons are used their thickness may vary throughout the same size range as the wires and in addition the ribbon width may vary from a few to as high as 100 wire diameters. To simplify the subsequent discussion consideration will be directed primarily to wire mats, however, the important design and operating factors apply to both types of mats. If desired, more than one size of wire may be used in an individual mat although more usually all the wires are of a single size. Since pressure is an important factor in the alkylation process, the wires are preferably arranged to present a minimum obstruction to flow. More usually the spacing of the wires and the wire size are proportioned to provide a low pressure drop, for example, when impinging in a mat having a thickness or depth between about 0.5 and about 8 inches and a liquid throughput of between about 0.8 and about 15 cubic feet/second per square foot of mat surface, the pressure drop therethrough is between about 0.1 and about 1 foot of flowing fluid. In one embodiment of the invention, maximum contact surface with a minimum of pressure drop is obtained by arranging the wire in the impingement mat in the form of a plurality of screens of rather wide mesh with successive screens being sufficiently displaced laterally to provide a minimum of open area in the longitudinal direction of flow and at the same time displaced sufficiently longitudinally to present a minimum obstruction to lateral flow. In such a mat each particle of the liquid has a large angular component of flow relative to its linear movement and thus follows a winding course through the mat. The thickness of the mat varies with the service and degree of the droplet subdivision desired, more usually in commercial operations the impingement material comprises between about 10 and about 200 wire screens and has an over-all thickness of about 4 and about 6 inches, thus providing good contact by depth. If the effective contact surface of the mat is considered as equal to ½ the total wire surface, then for each inch of depth the usual mat furnishes a contact surface area of between about 0.5 and about 20 square feet per square foot of mat surface, thereby providing a surface to volume ratio of between about 6 and about 240 to 1. The mats may be manufactured in any suitable shape for satisfactory installation in alkylation mixing equipment. For example, in one embodiment of the invention it may be desirable to use a mat in the shape of a doughnut. With other types of mixing equipment different shapes may be preferred.

The materials from which the mat is constructed include stainless steels, plastics, such as for example polytrifluorochloroethylene, polyethylene, etc., glass cloth, glass wool, tantalum and similar materials which are capable of forming a wire screen. It is desirable that the materials used be non-corrosive in the alkylation system and have a sufficient degree of strength to withstand normal operating stresses. For the latter reason, more usually it is preferred to use a metal selected from the group given.

To provide a maximum subdivision and dispersion of the olefin, in the catalyst-hydrocarbon emulsion, it is desirable that the mixture contact the impingement mat at a high superficial velocity, such as between about 0.8 and about 15 feet per second, and more usually between about 3 and about 10 feet per second. There is a minimum impingement velocity, depending on the particular system, below which the olefin fails to subdivide. More usually this critical velocity lies in the range between about 0.6 and about 0.8 foot per second. As the velocity of the mixture is increased above this minimum, olefin subdivision commences and progressively increases, and the olefin is more evenly dispersed throughout the emulsion. Depending on the degree of subdivision and dispersion desired, it is within the scope of this invention to operate at any superficial velocity above the minimum impingement velocity.

In order to more fully describe the invention and provide a better understanding thereof, reference is had to the accompanying drawings of which:

Figure 1 is a diagrammatic illustration of an alkylation contactor drawn in cross-section, Figure 2 is a partial view of a mixing pump shown in Figure 1 also in cross section and Figures 3, 4, 5 and 6 show various construction features of typical impingement mats.

Referring to the drawings, the alkylation reactions are carried out in a cylindrical elongated closed contacting vessel 41. The interior of approximately ⅔ of the contactor is divided into a number of separate reaction stages or sections 39, 39a and 39b by transverse baffles so arranged that liquid entering the end of the contactor passes from an inlet chamber 37 upward over a baffle down to the bottom of the first reaction section 39, upward through section 39 over a second baffle down to the bottom of the second section 39a and in a similar manner through the third section 39b. Each section contains a mixer 45, 45a and 45b respectively, in this specific illustration propeller type submersible pumps, disposed vertically with the drivers located outside and above the contactor 41 and the propellers located in the lower portion of each reaction section. Each pump is so constructed that material entering the suction thereof is forced upward within the pump casing and then downward and out through openings in the casing into the corresponding reaction section. The pump capacities are such that the quantity of material circulated through each pump is several times greater than the total liquid flow entering the section in which the pump is located.

The alkylation reactants and catalyst enter the contactor 41 at three different points. The alkylation feed comprising a mixture of propane, butane, isobutane, and butylene is split into three streams which enter in mixing pumps 45, 45a and 45b through conduits 57, 57a, 57b, respectively. This material passes downward within each pump through a hollow sleeve surrounding the pump shaft and is admitted to the liquid stream flowing through pump downstream of the pump impellers. A mixture of butane and isobutane is admitted to the inlet chamber 37 of the contactor through conduit 33 and the acid catalyst comprising fresh acid or a mixture of fresh acid and contaminated acid is admitted to the bottom of the first reaction section 39 through conduit 35. As illustrated, acid may also be introduced into the succeeding sections 39a and 39b through conduits 35a and 35b; also acid may be combined with the isobutane recycle through conduit 63 prior to the admission of this stream to the contactor.

The hydrocarbon passes from the inlet chamber 37 into the first section 39, is combined with the acid and the mixture enters the suction 40 of pump 45 where it is picked up, emulsified and directed upward at a high velocity. The alkylation feed from conduit 57 is admitted to the emulsion downstream of the pump propeller 13 and the mixture passes upwardly at a high velocity through a wire impingement mat whereby the olefin is finely subdivided and evenly dispersed in the emulsion. The alkylation reaction proceeds almost immediately and is substantially completed before the reactants leave the pump casing 29. As mentioned before, the capacity of pump 45 and the other pumps is sufficiently great to assure a circulation rate several times as large as the flow of olefin feed, isobutane and acid into section 39. Thus unreacted isobutane is circulated, along with the acid catalyst and a portion of the alkylation product, through the pump a number of times before it passes into the next section where another portion is reacted with fresh olefin feed. The same procedure is followed in section 39b.

The alkylation contactor 41 is maintained at a temperature of about 35° F. and at a pressure of about 3.5 p. s. i. g. Since the acid catalyst and hydrocarbon streams normally enter the contactor above 35° F., it is necessary to provide a method of cooling the reactor to remove the sensible heat in these streams. In addition, the exothermic mixture of the alkylation reaction requires further cooling to remove the heat of reaction and thereby maintain the reaction sections at the required low temperature. In this specific illustration, the cooling is accomplished by autorefrigeration of the reactants and reaction products. In carrying out this operation, vapors are withdrawn from the contactor through conduit 65 into a dry drum 67. Any material settling in the dry drum is returned to the contactor operation zone beneath the acid level through conduit 71. The dry gas from drum 67 enters the suction of a compressor (not shown) through conduit 69, is compressed, condensed, passed to a separation system for the removal of propane and the condensate is returned to the contactor in the isobutane recycle through conduit 33.

A substantial amount of the vaporization which occurs in the contactor takes place in the entrance chamber 37 and the reaction sections 39, 39a and 39b. The isobutane recycle stream enters the contactor as a liquid and at a higher temperature and pressure than that maintained within the contactor. As a result, a portion of this stream flashes in the entrance chamber 37. To prevent a mixture of liquid and vapor from passing into the suction of pump 45, an outlet for this gaseous material is provided through conduit 59. A similar situation prevails in each of the reaction sections, since, in order to remove the reaction heat from each section, it is necessary that a further amount of light material be vaporized therein. This material is supplied partially by the alkylation feed from conduits 57, 57a and 57b, which feed is also introduced at a temperature and pressure higher than that maintained in the contactor. Vapor formed in the reaction section is removed from the contactor through conduits 59a and 59b, is combined with vapor from conduit 59, passes into the upper portion of the contactor downstream of the last reaction section and is withdrawn from the contactor through conduit 65. By this method of operation, heat of reaction, heat of mixing, etc., is removed and a relatively constant temperature is maintained throughout the contactor.

The effluent from the last reaction section comprising a mixture of propane, butane, unreacted isobutane, alkylate and acid passes through an emulsion breaking zone 43 formed by parallel transverse baffles and containing a conventional inert packing material. All of the effluent from the last section is forced to flow through this zone by a deflector baffle 49 extending above the liquid level within the contactor and downward within the emulsion breaking zone. Upon leaving this zone, the acid separates from the hydrocarbon oil and is contained in a settling zone enclosed by baffle 51 over which butane, alkylate and unreacted isobutane flow into the remainder of the contactor. The contaminated acid, containing polymers and other impurities passes from the contactor through conduit 53 and the alkylate product and unreacted hydrocarbons are removed from the contactor through conduit 55 for further processing (not shown).

For a more detailed illustration of the alkylation mixer, reference is had to Figure 2 which is a sectional view of the portion of the mixer 45 lying below the supporting shell 29. This part of the mixer comprises essentially a venturi-shaped propeller and bearing casing 19, a propeller 13 enclosed therein and a shaft 1 for rotating the propeller. The propeller 13 is located centrally in the throat of casing 19 and the propeller blades are so constructed that rotation of the propeller produces a high degree of turbulence and imparts a tangential and an upward thrust to liquid entering the mixer. The propeller is keyed on shaft 1 at the lower extremity thereof. Movement of the propeller in a downward direction is prevented by a propeller lock nut 15 screwed to the end of the drive shaft and enclosed by cover nut 17 shaped to present a minimum resistance to liquid flow. The lower portion 8 of drive shaft 1 is of a smaller diameter than the upper part 10. Upward movement of the propeller along shaft 1 is prevented by a shaft sleeve 9 which bears against collar 7 which is fitted to the lower portion 8 of the shaft and in turn bears against the upper larger portion of the shaft. Enclosing the shaft sleeve 9 is a bearing bushing 11 which is held in place by a bearing block or bearing housing 5 and the upper portion of which is hollow. The hollowed portion of the housing in turn openly communicates with a hollow shaft casing 3 which encloses drive shaft 1. The entire assembly is maintained centrally within casing 19 by web stator vanes 22 situated above the propeller 13 in the diffusing section of casing 19. Surrounding the bearing housing 5 and extending outward to inner surface of casing 19 is a wire impingement mat 23. This mat, which is about 5 inches in thickness, is made up of a number of knitted stainless steel wire screens, the wire having a diameter of about 0.011 inch. To provide suitable spacing between the screens they are crimped in double thicknesses with alternate screens radially displaced about 90°, as illustrated in Figures 5 and 6. Support for the mat in the direction of flow is provided by tube sheet 26 and the mat is further supported at its periphery by the inner surface of casing 19. If desired suitable supporting means to prevent sagging of the mat during periods of inoperation may also be provided. The velocity of the mixture of olefin and emulsion through the impingement mat is high, namely about 9 feet per second. At this velocity, there is provided sufficient impingement of the olefin droplets to finely subdivide and disperse this reactant throughout the acid hydrocarbon emulsion.

The lower portion of the mixer containing the component parts just described is held to the upper portion by means of a circular series of bolts 2 which fasten the flanged casing 19 to the supporting shell 29. The top portion of shell 29 is closed except for the olefin inlet line 57 which passes through this shell and attaches to the hollow shaft casing 3. The bottom of the supporting shell is closed by an annular tube sheet 26 which contains a circular series of tubes 28 extending in an upward direction within the shell.

The mixture of acid and hydrocarbon, including propane, butane and isobutane entering the first reaction stage 39 is picked up by the propeller 13 and projected upward in a highly turbulent state and at a high velocity. The resulting emulsion enters the diffuser section of casing 19 where the tangential velocity components of the flowing emulsion are converted to longitudinal components thereby providing a higher longitudinal velocity than existed in the region directly adjacent to the propeller 13. Simultaneous with the passage of the emulsion through casing 19 the alkylate feed containing butylene reactant enters the hollow shaft casing 3, passes in a downward direction into the hollow portion of the bearing housing 5, and then through passageways 21 into the hollow stator vanes 22. This material is then introduced along with the emulsion into the impingement mat 23 where the olefin, through high velocity contact with the stainless steel wire, is broken up into fine particles and evenly dispersed throughout the emulsion. Dispersing the alkylate feed in the emulsion in this manner provides a maxium degree of mixing and at the same time a maximum isoparaffin to olefin ratio, thus producing a high rate of reaction and allowing little opportunity for polymerization of the butylene.

On introduction of the olefin containing feed into the acid-hydrocarbon emulsion the alkylation reactions proceed immediately and continue as the mixture of acid, isobutane and butylene moves upward. Leaving the diffuser section, the reaction mixture enters tubes 28 and passes upward into the supporting shell 29. The purpose of these tubes is to provide time for substantially complete reaction of the butylene before the reactants leave the mixer. The tubes 32 terminate a sufficient distance below the top of shell 29 to allow for reversal of flow in the passage of the reactants and reaction products in a downward direction within the shell 29. The alkylation reaction is highly exothermic and quantities of heat are given off which cause a portion of the reactants to vaporize within the pump. To prevent accumulation of vapors therein small ports or vent holes (not shown) are provided adjacent to the top of shell 29. The reactant mixture passes downward through the shell and out through discharge ports 31 and then in a downward direction to meet fresh isobutane and acid entering the suction of the pump.

It is within the scope of the invention to provide for the introduction of olefins into the acid-hydrocarbon emulsion in other ways than that illustrated in Figure 2. For example, improved dispersion of olefin prior to the impingement mat is obtained by introducing this material in the form of a number of small streams rather than as shown.

Although the preceding mode of operation comprises a preferred embodiment of the invention, it is not intended that the scope of the invention be limited thereby but that it include other processing methods and apparatus well known to those skilled in the art. For example, other suitable types of mixers may be used in place of the specific type of mixing means illustrated herein. An example of such a mixer is one in which a turbine impeller is used with stationary baffles arranged around the periphery of the rotating turbine blades. This turbine assembly would be located in the center of the reaction section and would draw emulsion from the bottom of the reactor into the center of the turbine and drive the emulsion horizontally against the stator baffles which deflect the emulsion downward while imparting turbulence and resulting mixing to the emulsion stream. As a result the emulsion would follow a flow path outward horizontally toward the walls of the reaction section, then curve downwardly and return to the center of the turbine, namely in a substantially oval or circular path. If desired additional stator baffles could be provided to impart an upward motion to a part of the emulsion to force this material in a similar path returning to the top of the turbine. The olefin feed would be introduced to the emulsion in the turbine casing through many small openings along the hollow top stator plate and the hollow deflection baffles or through a distribution ring located inside the circle of the turbine blades with holes pointed outward toward the blades so that feed enters with the flow of emulsion.

Due to the high velocity and turbulence of the flowing emulsion, vapors released as a result of the heat generated in the alkylation reaction normally would be recycled through the turbine. Impingement mats placed around the turbine blades, of sufficient height to include the outflow and/or return of emulsion to the turbine, would serve to provide impingement mixing of the emulsion and olefin. By restricting the velocity of liquid flow through the mats to below the critical coalescing vapor velocity, namely about 15 ft./second, the vapors would be trapped and would pass upward and leave the reaction zone, rather than returning to the turbine.

Referring now to the other illustrations, Figures 3, 4, 5 and 6 illustrate various construction features of typical impingement mats. In each of Figures 4 and 5 the distance between screens is exaggerated for clarity.

Figure 3 illustrates part of a mat which is made up of a number of flat wire screens of identical construction. Considering screen 75 as the first screen, the following screen 77 is displaced therefrom upward and to the right about ½ of the average distance between the wires which form screen 75, that is a displacement of about ½ of the mesh size of screen 75. The next screen 79 is displaced from screen 75 downward about ¾ of a mesh and to the left about ½ of a mesh. Relative to screen 77, this screen is displaced downward about 1¼ meshes and to the left about 1 mesh. This method of laterally displacing the screens relative to each other makes it possible to provide a mat having a very large impingement contact surface and produce almost complete obstruction to flow in the direction perpendicular to the mat, that is in the longitudinal direction of flow.

Since it is desirable to provide not only maximum impingement contact surface but also maximum flow through the mat with a minimum pressure loss, the screens which make up the mat are also displaced in the longitudinal direction so as to allow lateral flow between each screen. This is shown in Figure 4. Appropriate means may be provided for separating and supporting the screens to maintain the lateral and longitudinal displacements illustrated (not shown). As stated previously, the wires used in constructing the screens which comprise the impingement mat may vary in size between about 0.001 inch in diameter and about 0.10 inch in diameter. The factors of mesh size and lateral and longitudinal displacement between screens in a particular impingement mat are dependent to a great extent on the size of wire used. More usually, the screen mesh varies from between about 5 wire diameters to about 50 wire diameters and the displacement, both lateral and longitudinal, between successive screens varies between about 3 wire diameters and about 30 wires diameters. In this specific illustration the wire is stainless steel having a diameter of about 0.011 inch and the mat is composed of screens having a mesh of about 10 wire diameters, with a lateral and longitudinal displacement between screens of about 3 wire diameters.

Figure 5 illustrates another variation in impingement mat construction. In this mat the wire screens are crimped for example by being passed between two gears and are suitably separated from each other in a longitudinal direction by radially displacing alternate screens about 90 degrees. In this manner the matching valleys and hills are at right angles to each other and adjacent screens are in contact with each other at the point of contact of alternating valleys and hills. In order to allow maximum flow and provide a large impingement surface with a minimum of pressure drop, the screens are in addition displaced laterally similar to the screens in Figure 3. In addition to separating the screens, whereby no spacing means is required, crimping also imparts mechanical strength to the mat. The mesh size and lateral and longitudinal displacement provided by a mat of this type are preferably of the same order of magnitude as those given for the mat of Figure 3 or 4.

Figure 6 presents another construction feature in which the screens which comprise the mat are made up of knitted wire. In a mat of this type the openings in each screen are sufficiently irregular to reduce the necessity for lateral displacement between the screens particularly when longitudinal displacement is provided by crimping the screens as in Figure 5. It may be desirable with this type of screen, as well as with that shown in Figure 5, to crimp more than one screen together to provide screens of double, triple and greater thickness and thereby impart a higher degree of mechanical strength to the mat.

The preceding illustrations have been directed to impingement mats constructed of wire. As noted previously, wire ribbons may also be used in mats of similar construction to provide comparable results.

Having thus described the invention by reference to a specific application thereof, it is understood that no undue limitations are to be imposed by reason thereof, but that the scope of the invention is defined by the appended claims.

I claim:

1. In an alkylation process in which an alkylatable hydrocarbon is reacted with an olefin in the presence of an acid catalyst, the improvement which comprises emulsifying the acid and alkylatable reactants in a contacting zone under suitable conversion conditions, passing said emulsion through a confined reaction zone at a superficial velocity of from about 0.8 to 15.0 feet per second, introducing olefin reactant into said reaction zone to form a reaction mixture with said emulsion and passing said mixture through a highly permeable wire mat for impingement contact therewith and even dispersal of the olefins throughout said emulsions, the permeability of said mat controlled to provide a pressure drop in said mixture flowing therethrough of from about 0.1 to 1.0 foot of flowing fluid.

2. In an alkylation process in which an isoparaffin is reacted with an olefin in the presence of an acid catalyst at a temperature of between about 0° F. and about 150° F. and between about atmospheric pressure and about 100 p. s. i. g., the improvement which comprises emulsifying the acid and isoparaffin in a contacting zone under suitable conversion conditions, passing said emulsion through a confined reaction zone at a superficial velocity of from about 0.8 to about 15 feet per second, introducing olefin reactant into said reaction zone to form a reaction mixture with said emulsion and passing said mixture through a highly permeable wire mat for impingement contact therewith and even dispersal of the olefins throughout said emulsion, the permeability of said mat controlled to provide a pressure drop in said mixture flowing therethrough of from about 0.1 to about 1.0 foot of flowing fluid.

3. An apparatus for dispersing an olefin in an alkylation catalyst-hydrocarbon emulsion which comprises a pump having a propeller section and a diffuser section, said pump section adapted to form said emulsion and propel it through said diffuser section at a high superficial velocity, means for introducing the olefin into the emulsion as it flows through said diffuser section, and impingement means of high permeability and low flow resistance in said diffuser section adjacent to and downstream of the point of introduction of the olefin in said diffuser section, said impingement means disposed for flow of said emulsion and introduced olefin therethrough for dispersal of said olefin uniformly in said emulsion, said impingement means formed of spaced lengths of filament material, said filament of a size and said lengths so spaced apart to provide a pressure drop through said impingement means of from about 0.1 to 1.0 foot of flowing fluid at superficial flow velocities of the emulsion in said diffuser section of from about 0.8 to 15.0 feet per second.

4. The apparatus of claim 3 in which said impingement means comprises a plurality of wire screens suitably displaced longitudinally and laterally, said impingement means of sufficient thickness to provide impingement by depth.

5. The apparatus of claim 3 in which said impingement means has an impingement surface to volume ratio of between about 6 and about 240 to 1.

6. The apparatus of claim 3 in which said impingement means comprises a plurality of longitudinally spaced crimped wire screens of double thickness each double screen being displaced radially about 90° from the preceding screen.

7. The apparatus of claim 3 in which said impingement means is constructed of wire having a diameter between about 0.001 and about 0.1 inch and has an impingement surface to volume ratio of between about 6 and about 240 to 1.

References Cited in the file of this patent

UNITED STATES PATENTS

| | | |
|---|---|---|
| 1,000,641 | Tebbit | Aug. 15, 1911 |
| 2,238,802 | Altshuler et al. | Apr. 15, 1941 |
| 2,263,534 | Aldridge | Nov. 18, 1941 |
| 2,454,869 | Goldsby et al. | Nov. 30, 1948 |
| 2,721,790 | Olney | Oct. 25, 1955 |